Feb. 23, 1932.   C. D. FAGAN ET AL   1,846,712
VALVE FOR GASOLINE DISPENSING SYSTEMS
Filed July 3, 1928   3 Sheets-Sheet 1

INVENTORS
Charles D. Fagan
George Ramsey
BY
George Ramsey
their ATTORNEY

Feb. 23, 1932.   C. D. FAGAN ET AL   1,846,712
VALVE FOR GASOLINE DISPENSING SYSTEMS
Filed July 3, 1928   3 Sheets-Sheet 2

INVENTORS
Charles D. Fagan
BY George Ramsey
George Ramsey
their ATTORNEY

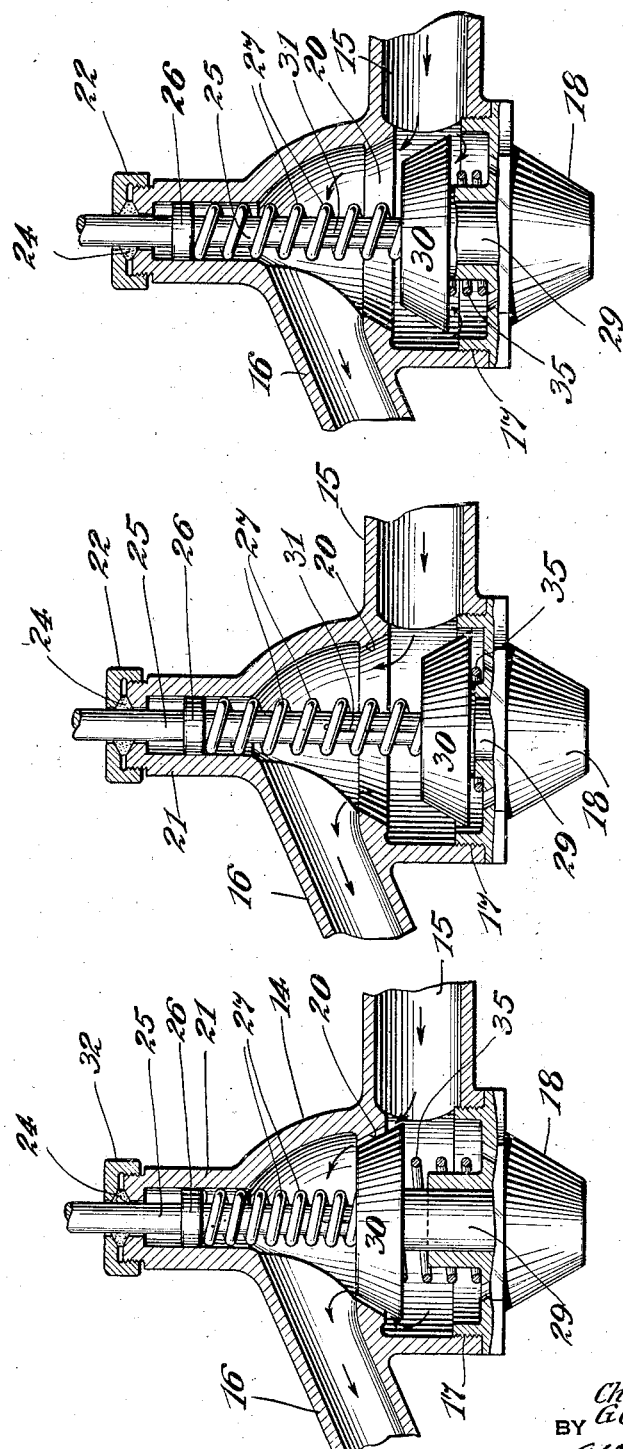

Patented Feb. 23, 1932

1,846,712

UNITED STATES PATENT OFFICE

CHARLES D. FAGAN, OF SHARON, PENNSYLVANIA, AND GEORGE RAMSEY, OF BROOKLYN, NEW YORK, ASSIGNORS TO SHARPSVILLE BOILER WORKS COMPANY, OF SHARPSVILLE, PENNSYLVANIA, A CORPORATION OF PENNSYLVANIA

VALVE FOR GASOLINE DISPENSING SYSTEMS

Application filed July 3, 1928. Serial No. 290,116.

The present invention relates to a dispensing system for gasoline adapted for use at service stations.

In general, the invention comprises a valve for a dispensing system in which the gasoline is driven under pressure through a meter into a dispensing hose which carries on its outer end a dispensing nozzle equipped with a full action valve, that is, the valve is either full closed or full open and the operator cannot hold it in an intermediate position.

In meter systems where the gasoline passes through a flow meter type of measuring device, the accuracy of the measure of the gasoline passing through the flow meter depends upon the rate at which the gasoline is permitted to pass through the meter. In systems of this kind where the operator can control the amount of the valve opening, he can control the rate of flow through the meter and thereby cause a false reading of the meter. This may be done accidentally or it may be done intentionally. In the present system, the meter and pipes adjacent thereto are filled with gasoline down to and including the dispensing pipe up to the operator's valve. When the operator depresses the valve handle, the valve does not immediately open but differential pressure is built up which finally causes the valve to suddenly open to the full extent, and immediately a full flow of gasoline starts through the meter. When the meter reads exactly the amount of gasoline which the purchaser desires, the operator releases pressure on the valve handle and the valve immediately snaps to the valve seat, thereby completely stopping the flow. This, therefore, insures either a full open valve or a completely closed valve and without any possibility of the valve being held so as to partially interrupt or restrict the flow through the meter.

Other and further objects of the invention will in part be obvious and will in part be pointed out hereinafter in the specification following by reference to the accompanying drawings forming a part of this specification.

It is realized that the present invention may be embodied in constructions other than those specifically disclosed and therefore it is to be understood that the disclosure herewith is illustrative and not in the limiting sense.

Fig. 1 diagrammatically illustrates one form of the system comprising the present invention.

Fig. 3 is a detailed sectional view illustrating the beginning of the sudden movement which fully opens the valve.

Fig. 4 is a view similar to Fig. 3 except that the valve is shown in full open position at the end of the quick opening movement.

Fig. 5 illustrates the action of the valve in the quick closing movement.

Figure 1:
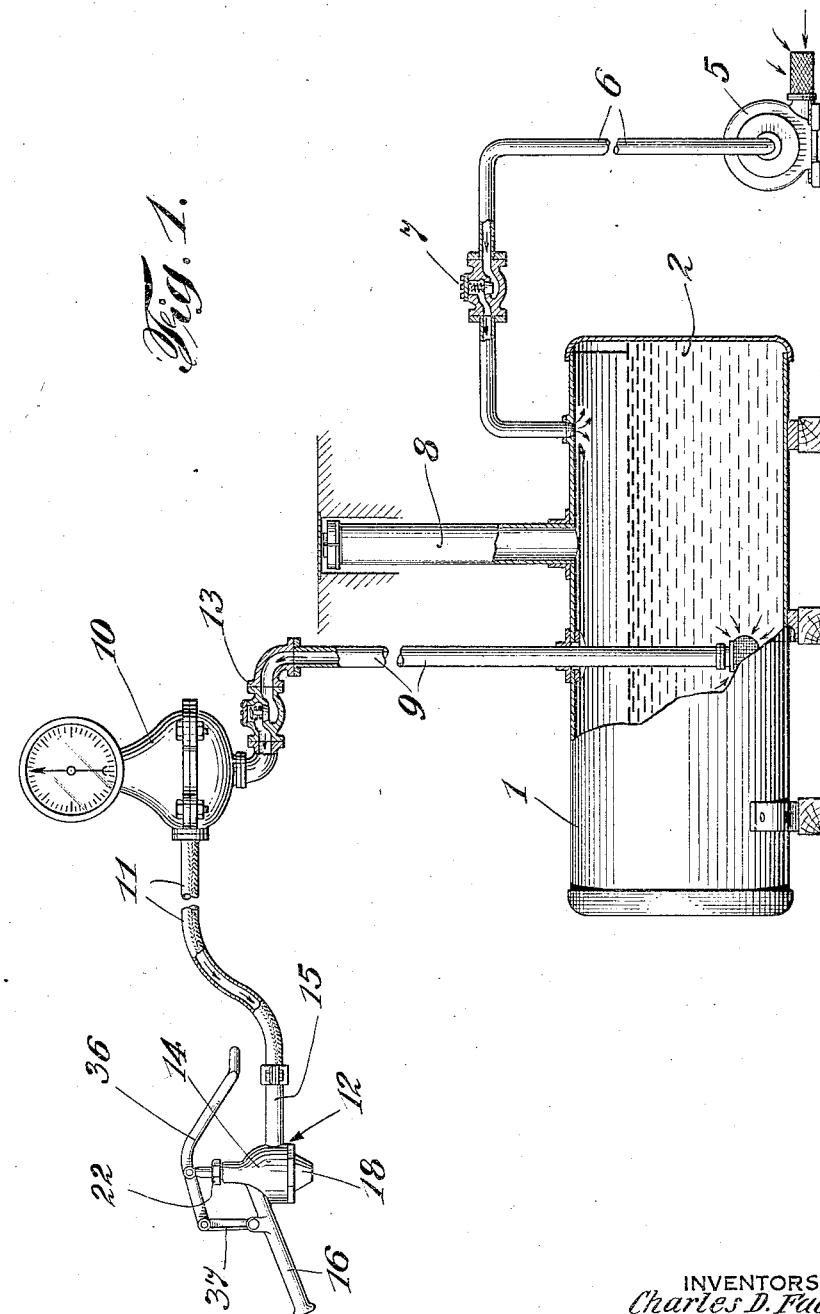

In the present invention, it is essential that the gasoline be delivered under pressure to the meter, and to this end various types of pressure devices common in the art such as gravity feed or pump feed may be used, and as a matter of illustration, Fig. 1 shows a storage tank 1, partly filled with gasoline 2 with the space 4 above the gasoline comprising vapor and air under pressure produced by an air pump 5 which is connected to the tank 1 by means of the pipe 6 that carries a check valve 7. This pump may be automatically controlled as is common in the art to maintain a predetermined pressure on the gasoline or the special pump may be eliminated and the storage tank 1 may be connected with the air compressor system usually a part of a service station equipment. The storage tank 1 is provided with any suitable type of fill pipe 8 common in the art. An outlet pipe 9 leads into the gasoline 2 in the storage tank, and the compressed air and vapor above the gasoline forces the gasoline into the outlet pipe 9 and through the flow meter 10 connected to the outlet pipe 9. A dispensing hose 11 leads from the meter 10 to a dispensing nozzle 12, and this dispensing hose 11 down to the nozzle 12 is also filled with gasoline which has passed through the flow meter under the pressure exerted on the surface of the gasoline in the storage tank 1. This pipe 9 may carry a check valve 13 which insures there can be no back flow of gasoline from the meter 10.

The dispensing nozzle 12 comprises a conduit casing 14 with one end 15 being adapted to be attached permanently to the dispensing hose 11 and with the other end 16 comprising a short pipe section adapted to be inserted through the fill cap opening of a gasoline tank of an automobile (not shown). This casing 14 is provided with a threaded opening 17 which carries a cap 18, and through the opening 17 the valve members are adapted to be assembled into the casing. A ledge 19 is formed between the sections 15 and 16 of the casing 14 and is provided with a valve seat 20. A plunger guide portion 21 is also provided on the casing 14 and is adapted to carry compression nut 22 which compresses a gasket 24 around an operating plunger. This operating plunger is provided with a collar 26 adapted to slide in the stem guide 21 and to form a shoulder against which a relatively strong compression spring 27 may react and also a stop to limit the outward movement of the plunger 25. The lower end of the operating plunger 25 fits within an opening 28 in the valve stem 29 of the hollow valve 30. Grooves 31 are provided in the side of the operating plunger to obviate the formation of vacuum under the plunger and to permit either ingress or egress of any gasoline which may flow in the opening 28 of the valve stem 29 of the hollow valve 30. The lower end of the strong compression spring 27 surrounds the operating plunger 25 and bears very lightly against the top of the hollow valve 30 when this valve is closed. The cap 18 is provided with a well 32 in which the valve stem 29 slides and this well communicates with the interior of the casing 14 by means of openings 34 leading from the bottom of the well 32 into the open passage through the casing 14. A relatively weak compression spring 35 is compressed between the cap 18 and the under portion of the hollow valve 30 and at all times exerts pressure under the valve tending to seat the valve. An operating handle 36 is connected to the outer end of the operating plunger 25 and also to a fulcrum link 37 which is pivoted to the lugs 38 on the nozzle portion 16 of the casing 14.

Referring now to Figs. 3, 4, and 5, and assuming that gasoline under pressure is pressing against the under side of the valve 30 and under the stem 29 of this valve, the operator depresses the operating handle thereby compressing the strong compression spring 27 against the top of the valve 30 and telescoping the inner end of the operating plunger into the opening 28 of the valve stem 29. This action continues as the operator depresses the handle until a condition is reached indicated in Fig. 3, at which time sufficient energy has been stored in the strong compression spring 27 to overcome the forces acting beneath the valve to hold the valve closed, these closing forces being the combined action of the pressure of the gasoline and the lifting force of the weak compression spring 35. As soon as the forces beneath the valve 30 have been overcome, the valve starts to open, thereby immediately reducing the pressure of the gasoline underneath the valve 30, which immediately places the valve mechanism in a condition whereby the force stored in the strong compression spring 27 is considerably greater than the forces acting beneath the valve tending to seat the valve. This results in the spring 27 immediately snapping the valve full open to the position shown in Fig. 4 and compressing the weak compression spring 35. Preferably, though not necessarily, the area of the valve seat opening 20 is considerably greater than the cross sectional area of the nozzle conduit 16 so that a slight back pressure builds up in the system. This back pressure plus the forces active through the strong compression spring 27 and the action of the flow of gasoline against the conical sides of the valve 30 hold the valve 30 open so long as the operator retains pressure on the operating handle.

As soon as the operator releases pressure on the operating handle, the strong compression spring 27 expands in an upward direction so that the upper end of the spring follows the collar 26 on the operating handle in its outward movement without any movement taking place as to the valve 30 which is still retained in full open position. As the operator continues to permit the operating handle to rise the strong compression spring 27 expands sufficiently to lose enough of its effective force to permit the weak compression spring 35 to start to raise the valve 30. This causes the valve 30 to rise into the flow zone of the gasoline under pressure, and on the conical inlet side of the valve 30 begins to move into the valve seat opening and thereby reduce the pressure on the outlet side. The moment this occurs, the valve moves closed and slightly compresses the spring 27. As the valve starts to close, the pressure on the inlet side of the valve builds up almost instantly, while the pressure on the outlet side correspondingly drops. This quickly jams the valve tightly into the valve seat even though the operator may not have removed full pressure from the operating handle. In other words, the strength of the strong compression spring 27 is such that this spring cannot resist the pressure on the inlet side of the valve unless the spring 27 is substantially compressed as illustrated in Fig. 3.

Figure 2:
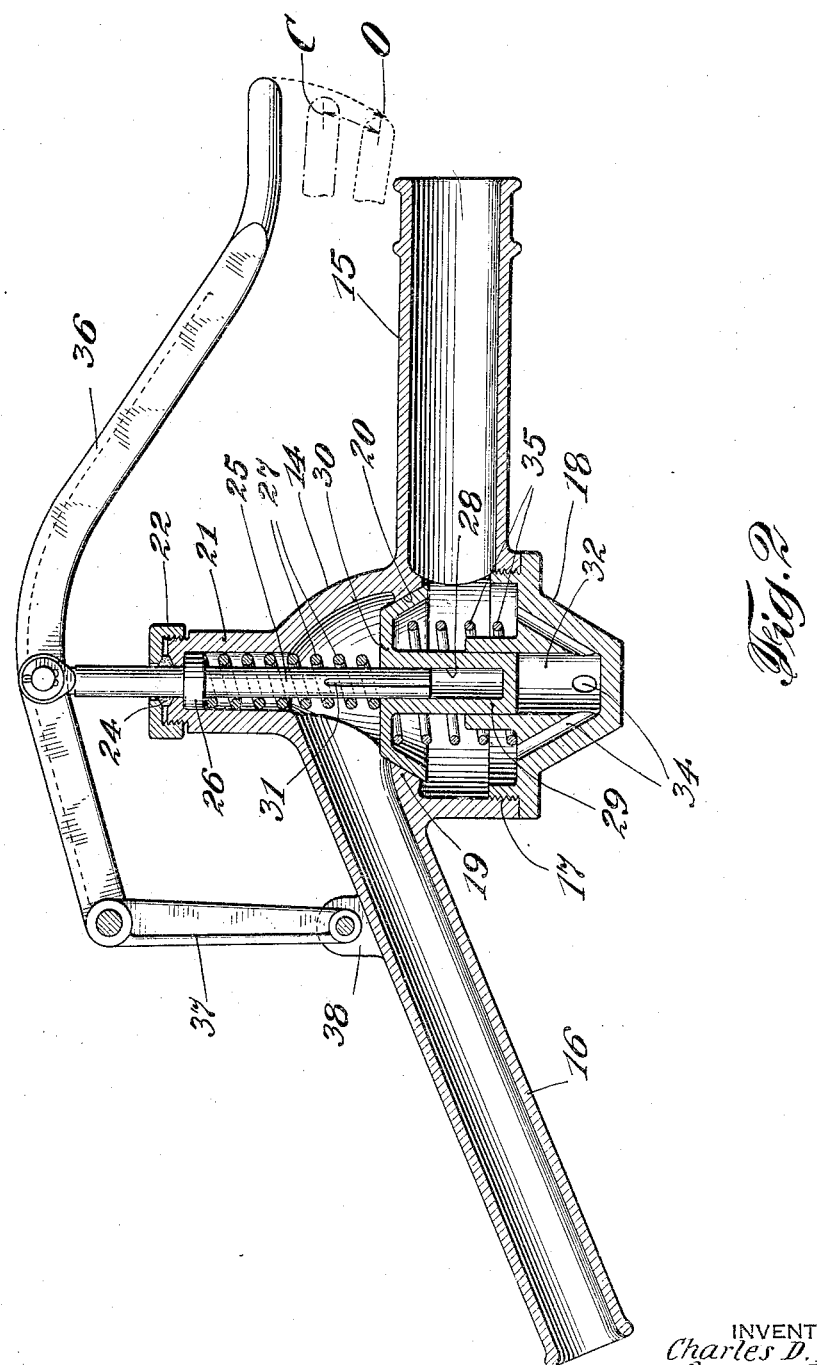
Fig. 2 illustrates a section through a preferred form of operator's valve.

From the foregoing it will be observed that the operating valve does not start to open until the operator has depressed the operating handle to nearly its full extent of depression and that when the valve does start to open, it immediately opens to full position. Thus the valve does not start to close until after the operating handle has been raised considerably above the position which the operating handle must take before the valve begins to open. Consequently, the valve goes full open when the operating handle reaches the position O (Fig. 2) and does not start to close until the operating handle has reached the position C (Fig. 2), at which time the valve travels to completely closed position. This is because the valve 30 does not start to close until the energy in the spring 27 has been reduced considerably below the amount necessary to open this valve, even though the operating handle be held stationary after the closing moment starts.

From the foregoing it will be apparent that in the present system with a flow meter for measuring the gasoline which comes to the meter under pressure that the operator cannot cause a trickle from the nozzle through the meter, but must in all cases operate the system with the nozzle either full open or full closed. In this type of dispensing system there is no possibility of gasoline which has passed through the meter being returned to the storage tank, therefore where the meter is properly operated, as by the full opening and full closing operator's valve, the amount measured is the amount delivered.

Having described our invention, we claim:

1. In a gasoline dispensing system of the class described, a valve, an operating handle for said valve, and means rendered operative by said operating handle to force said valve full open when the operating handle is retained in position to initiate the opening of said valve.

2. In a valve for controlling the flow of gasoline under pressure through a dispensing nozzle, the combination with a valve member, of a casing having a valve seat therein for said member, an operating handle for said valve member, a plunger telescoping into said valve member, a relatively heavy compression spring surrounding said plunger and bearing upon said valve member, a stem on said valve member, a cap provided with a well adapted to receive said stem, conduits leading from said well to the interior of the valve casing, and a relatively light compression spring between said cap and said valve member, said light compression spring being adapted to raise said valve member when the heavy compression spring above said valve member is under light compression from the operating handle.

3. In a gasoline dispensing system of the class described, a valve adapted to be opened and closed at the will of the operator, an operating handle, and means rendered effective by the operating handle whereby said valve is automatic in the opening and closing movements after the opening or closing is initiated by the operation of said handle.

4. In a valve mounted in a nozzle for dispensing gasoline under pressure, spring means for forcing said valve full open after actuation of the spring means and the opening movement of said valve is initiated, and operating means for actuating said spring means thereby initiating the opening movement of the valve.

CHARLES D. FAGAN.
GEORGE RAMSEY.